United States Patent [19]

Regenauer

[11] Patent Number: 5,185,383
[45] Date of Patent: Feb. 9, 1993

[54] HYDROXYL CONTAINING COMPONENT FOR USE IN CREATING POLYURETHANE FOAMS

[75] Inventor: Gerhard Regenauer, Warwick, N.Y.

[73] Assignee: Urethane Technology, Co., Inc., Newburgh, N.Y.

[21] Appl. No.: 629,244

[22] Filed: Dec. 18, 1990

[51] Int. Cl.$^5$ ............................................. C08G 18/28
[52] U.S. Cl. ................................ 521/155; 521/163; 521/164; 521/170; 521/172; 521/174
[58] Field of Search ............... 521/173, 174, 163, 164, 521/128, 172, 155, 170

[56] References Cited

U.S. PATENT DOCUMENTS

| | | | |
|---|---|---|---|
| 4,258,137 | 3/1981 | Cogliano | 521/156 |
| 4,371,629 | 2/1983 | Austin | 521/129 |
| 4,407,981 | 10/1983 | Aaronson | 521/171 |
| 4,442,238 | 4/1984 | Zimmerman et al. | 521/164 |
| 4,525,490 | 6/1985 | Smith | 521/124 |
| 4,717,738 | 1/1988 | Fukuda et al. | 521/173 |
| 4,935,460 | 6/1990 | Cassidy et al. | 521/163 |
| 5,010,116 | 4/1991 | Colafati | 521/155 |

Primary Examiner—John Kight, III
Assistant Examiner—John M. Cooney, Jr.
Attorney, Agent, or Firm—Omri M. Behr; Matthew J. McDonald

[57] ABSTRACT

An hydroxyl containing compound for use in a sprayable system for creating polyurethane foams without the use of fluorinated hydrocarbons, the component containing a condensation product of an aliphatic triol with propanol or ethanol and/or a condensation product of a hexose with propane diol or propane triol, the condensation product in combination with an aliphatic amino polyol; an aromatic amino polyol; a polyurethane rapid initiator; a surfactant; a catalyst; and water.

20 Claims, No Drawings

HYDROXYL CONTAINING COMPONENT FOR USE IN CREATING POLYURETHANE FOAMS

FIELD OF THE INVENTION

The present invention relates to a composition for making rigid, sprayable closed-cell urethane foams without the use of flourinated hydrocarbons. These foams may be used in roofing, insulation of tanks, piping and refrigerated equipment, as well as any other housing requiring insulation with good dimensional stability.

BACKGROUND OF THE INVENTION

Cellular plastic polyurethane foams are conventionally made by mixing ingredients and curing the polymerizing mass in a mold. Thus, U.S. Pat. No. 2,814,600 describes mixing polythiourethane with water and a tertiary amine catalyst. The reaction of the polymer with water releases carbon dioxide, with the result that the mass foams into a cellular material.

Various other materials have been combined with di-isocyanate or di-isocyanate-type materials in an attempt to improve the resulting molded cellular molded plastics. For example, certain polyesters were introduced in U.S. Pat. No. 2,779,689; certain polyamines and polyaclcohols in U.S. Pat. No. 2,850,464; certain polymeric materials with an active hydrogen in U.S. Pat. No. 2,888,413; and certain polyhydric, polyalkylene ethers in U.S. Pat. Nos. 3,055,845; 3,252,943; and 4,454,251. In these disclosures, the cellular foam is made as stated by mixing the components and then subjecting the mixture to heat until the material has cured. This batch wise method restricts production of the foams and requires substantial amounts of energy consumption.

Conventional spraying of cellular plastic materials offers a quicker, more convenient process of production. Polyurethane foams have been conventionally by spraying a monomer (or prepolymer) onto a substrate. The polymerizing agent is combined with the monomer to form the cellular plastic either in a simultaneous spraying of the prepolymer and polymerizing agent or by subsequently spraying the polymerizing agent onto the same substrate.

As with the mold-cured plastics above, addition of various organic compounds has been made in an effort to improve the result of the foam. Among the materials that have been added are certain polyesters, in U.S. Pat. No. 2,779,689; and certain polyether polyols, in U.S. Pat. Nos. 4,543,366; 4,649,162; and 4,950,695.

Despite these efforts, several problems still occur in industrially produced polyurethane foams. First, these foams usually contain chlorofluorocarbon compounds as "foaming agents". That is, as an agent which generates gas in the mixture of monomer and catalyst to impart cellular structure. However, in recent years, these chlorofluorocarbon compounds have been criticized as contributing to the depletion of ozone in the atmosphere. As a result, the use of chlorofluorocarbons is being restricted by Legislation and regulation in many countries.

Another problem with industrially produced conventional foams is poor density and low compressive strength. Industrial produced foams should have relatively light density, yet be sufficiently strong to support weights and withstand foreseeable impact. Those conventional foams which have been sufficient compressive strength have generally had too great a density to be desirable. Further problems in conventional foams include high density of the materials to be sprayed. Excessive viscosity of sprayable materials results in frequent clogging of the spraying mechanisms, leading to production interruption with inefficiency. Another problem of conventional foams is surface friability, which not only makes the finally produced foam unattractive but renders it vulnerable to wear over time. Conventional materials which are sprayed to form foams often have sensitivity to ambient humidity, requiring that they only be sprayed on days with low atmospheric humidity. When such materials are sprayed on damp days or in damp conditions, the resultant foam is weakened. One final problem which affects conventional foams is reactivity to substrate temperatures. When foams are sprayed onto substrates which undergo great variations in temperature, many conventional foams suffer structural damage due to insensitivity.

SUMMARY OF THE INVENTION

Applicants have discovered a hydroxyl group containing component for use in a system for creating polyurethane foam. When this component is combined with a di-isocyanate or di-isocyanate-type material no chlorofluorocarbon foaming agent is required. The foam is entirely water-blown. Thus, production of this foam presents no environmental problem.

Moreover, the foam resulting from use of the hydroxyl group containing component has good density and compression strength (15–80 $kg/m^3$ and 1.5–4.5 $kg/cm^2$ respectively).

The foams resulting from use of the hydroxyl group containing component further have improved surface friability and reduced sensitivity to ambient humidity and substrate temperature. Finally, the hydroxyl group containing component itself has a desirably low viscosity, such that use of this component in spraying mechanisms results in very little if any clogging.

Thus, one embodiment of the invention is a hydroxyl group containing component for use in a system for creating polyurethane foam without the use of fluorinated hydrocarbons comprises a component A and a component B in a 1:1 ratio, and as component A, diphenylmethane, di-isocyanate; and as component B, said hydroxyl group containing component, the hydroxyl group containing component consisting essentially of at least one member of the group factors, Factor 1 and Factor 2 (i) and (ii) said factors consisting essentially of:
(i) a condensation product of an aliphatic triol with propanol or ethanol;
(ii) a condensation product of a hexose with propanediol or propane triol; and
(iii) an aliphatic amino polyol, or aliphatic polyester polyols, or aliphatic polyether polyols;
(iv) an aromatic amino polyol;
(v) a polyurethane rapid initiator;
(vi) a surfactant;
(vii) a catalyst for the hydroxyl/di-isocyanate polymerization reaction; and
(viii) water.

As a preferred embodiment of the invention the hydroxyl group containing component also has a component A and B in a 1:1 volume ration, where component A is again diphenylmethane di-isocyanate and component B, said hydroxyl group containing component, said hydroxyl group containing component consisting essentially of mixture totaling 100 parts by weight of from about 18 to about 45 parts of at least one member of the group of factors (i) and (ii), said factors consisting essentially of:
(i) from about 25 to about 12 parts of a condensation product of an aliphatic triol with propanol or ethanol of OH number from about 50 to about 650 and molecular weight from about 250 to about 1600,
(ii) from about 6 to about 18 parts of a condensation product of a hexose with propanediol or propanetriol of OH number from about 200 to about 800 and a functionality of 4–5, and
(iii) from about 24 to about 40 parts of an aliphatic aminopolyol of OH number from about 300 to about 900 and a functionality of 3–5,
(iv) from about 7.5 to about 22.5 parts of an aromatic aminopolyol of OH number from about 200 to about 800 and a functionality of 3–5,
(v) from about 0.5 to about 1.5 parts of a polyurethane rapid initiator,
(vi) from about 0.5 to about 1.5 parts of a surfactant,
(vii) from about 0.75 to about 3.75 parts of a catalyst for the hydroxyl/di-isocyanate polymerization reaction,
(viii) from about 6 to about 0.6 parts of water.

In a further preferred embodiment of the invention the hydroxyl containing component additionally contains from about 7.5 to about 22.5 parts of the tri(-haloalkylphosphate).

In yet a further especially preferred embodiment of the invention, the hydroxyl group containing component has a catalyst consisting essentially of from about 0.25 to about 0.75 parts of a catalyst for the water/di-isocyanate polymerization reaction and from about 1 to about 3 parts of a catalyst for the polyol/di-isocyanate polymerization reaction.

In still another embodiment of the invention, the hydroxyl group component containing the catalysts listed above, further contains as factor (i) at least one member of the group consisting of propoxylated glycerol and ethoxylated glycerol; as factor (ii), at one member of the group consisting of propoxylated sucrose and propoxylated glycerol; as factor (iv), at least one member of the group consisting of triethylamine, diethyleneamine, lead naphthenate, tin naphthenate and tin mercaptan. Factor (vi) is a polysiloxane; Factor (ix) is a tri (lower alkyl phosphate) of 1–4 carbons in the alkyl moiety, and as catalyst for the water/di-isocyanate reaction, there is at least one member of the group consisting of triethylamine and diethylene amine and as the catalyst of polyol/di-isocyanate reaction, there is at least one member of the group consisting of tris(3-dimethylamino)propylamine and peniamethyl diethylene triamine.

A further embodiment of the invention comprises a sprayable system for creating polyurethane foam without the use of fluorinated hydrocarbons, comprising as component A diphenylmethane di-isocyanate and as component B, one of the combinations of elements above.

Yet another embodiment of the invention comprises a sprayed polyurethane foam created without the use of fluorinated hydrocarbons, created from a system comprising as component A diphenylmethane di-isocyanate and as component B, one of the combinations of elements listed above.

In a preferred embodiment of the invention, a sprayed polyurethane foam having a component A, diphenylmethane di-isocyanate and component B, one of the combinations of elements listed above, as a compressive strength of from about 1.5 to about 4.5 kg/cm$^2$ and a density from about 15 to 80 kg/m$^3$.

A final embodiment of the invention constitutes a method of forming a spray of polyurethane foam without the use of fluorinated hydrocarbons which comprises mixing in a conventional foam spraying means as component A, diphenylmethane di-isocyanate, and as component B, one of the hydroxyl groups containing components described above. This mixing is performed at temperatures from ambient to 150° F. or (65.5° C.) in the absence of additional propellants.

In a preferred variant of this method, the weights of the respective components are selected to provide substantially lower equivalent numbers of isocyanate groups in component A and hydroxyl groups in component B.

DETAILED DESCRIPTION OF THE INVENTION

The first embodiment of the invention is a hydroxyl group containing component to use in a system for creating polyurethane foam without the use of fluorinated hydrocarbons comprising, a component A and a component B in a 1:1 volume ratio, and as component A, an organic polyisocyanate materials in the formula $R(NCO)_n$, where R represents polyfunctional, optionally, urethane, biuret, carbodiimide, and isocyanurate group-containing aliphatic, cycloaliphatic, araliphatic, or preferably aromatic radicals or mixed radicals of the type. n is a whole number whose value is equal to the valence of R and is at least 2, for example from 2 to 6, and preferably from 2 to 3. Typical individual examples include aliphatic di-isocyanates such as ethylene di-isocyanate, 1,2-propylene di-isocyanate, 1,4-butylene di-isocyanate, 2,2,4-trimethylhexamethylene-1,6-di-isocyanate, 2-ethylbutylene 1,4-di-isocyanate, and preferably 1,6-hexamethylene di-isocyanate cycloaliphatic di-isocyanates such as 1,2-cyclohexane di-isocyanate, 1,4-cyclohexane di-isocyanate, 1-methylcyclohexane 2,4-di-isocyanate and 2,6-di-isocyanate as well as corresponding isomer mixtures, 4,4'-,2,4'-, and 2,2'-dicyclohexylmethane di-isocyanate as well as corresponding isomer mixtures, and preferably 3-isocyanatomethyl 3,5,5-trimethylcyclohexylisocyanate, and polyisocyanate such as polycyclohexylpolymethylene polyisocyanates having from 2 to 6, preferably 3, cyclohexylene radicals in the molecule, and preferably aromatic polyisocyanates such as meta- or para-phenylene di-isocyanates, biphenyl di-isocyanate, 2,4- and 2,6-toluene di-isocyanate and corresponding isomer mixtures, 4,4'-, 2,4'-, and 2,2'-diphenylmethane di-isocyanate and corresponding isomer mixtures, mixtures of 4,4'-, 2,4'-, and 2,2'-diphenylmethane di-isocyanates and polyphenyl polymethylene polyisocyanates (polymeric MDI) and mixtures of polymeric MDI and toluene di-isocyanates.

As component B, the system includes the hydroxyl group containing component which consists essentially of a mixture of at lest one member of the group of factors (i) and (ii). Factor (i) consists essentially of a condensation product of an aliphatic triol, propanol or ethanol. The aliphatic chain length is suitably from 3 to 20 carbon atoms prior to condensation, preferably from 3 to 12 carbon atoms. The condensation product, having an hydroxyl number of about 50 to 650 has molecular weight of from about 250 to about 1600.

These condensation products are produced by conventional methods which are well known in the art.

These ethoxylated or propoxylated triols reduce the viscosity of the B component and enhance the curing of the foam material.

Factor (ii) consists essentially of a condensation product of a hexose with propanediol or propanetriol. Suitable hexoses include linear or cycloaliphatic hexoses which may be either industrially produced or naturally derived. Suitable propanediols include 1,1-propanediol, 1,2-propanediol, and 1,3-propanediol. Suitable propane triols include 1,1,1-propane triol, 1,1,2-propane triol, 1,1,3-propane triol, as well as all other propane triol permutations. These propanediols and propanetriols are made by conventional methods. The condensation of the propanediols or triols with hexose is performed by conventional reactions well known in the art.

The molecular weight of the resulting condensation products ranges from 200 to 3000 and has a hydroxyl number of from about 200 to about 800 and functionality of 4–5.

This condensation product is used as a cross-linking agent in the foam and to improve the foam's heat resistance. The condensation product helps to eliminate scorching of the foam once it is applied to a substrate; and also to eliminate possible ignition during the spraying.

Component B of the system also includes factor (iii), that is an aliphatic aminopolyol, or aliphatic polyesterpolyols, or aliphatic polyetherpolyols.

In the aliphatic aminopolyol, the aliphatic chain length may be from 3 to 20 carbon atoms long. The hydroxyl number of aliphatic aminopolyol is from about 300 to about 900 and has a functionality of from 3–5, and molecular weight range of 600 to 3000.

Suitable aliphatic amino polyols include, dialkanol amines such as, for example, diethanol amino and the like, N-alkyl dialkanol amines such as, for example, N-methyl diethanol amines, trialkanol amines, such as for example, triethanol amine and the like, N,N,N',N'-tetrakis (2-hydroxy propyl) ethylene diamine and the like.

These compounds, which are made by one of conventional methods, have the effect of lowering the viscosity of component B and improving the cure time of the foam.

In the aliphatic polyester polyols, the chain length of the aliphatic moiety may be from 3 to 20 carbon atoms long. The hydroxyl number of the aliphatic polyester polyol is from about 300 to about 900 and has a functionality of from 3–5 and molecular weight range of 220 to 600.

Suitable polyester polyols may be prepared, for example, from organic dicarboxylic acids having from 2 to 12 carbon atoms, preferably alihatic dicarboxylic acids having from 4 to 6 carbon atoms, and polyfunctional alcohols, preferably diols, having from 2 to 12 carbon atoms, preferably from 2 to 6 carbon atoms. Typical dicarboxylic acids are: succinic acid, glutaric acid, adipic acid, suberic acid, azelaic acid, sebacic acid, decane dicarboxylic acid, maleic acid, and fumaric acid. The dicarboxylic acids may be used individually and as mixtures with one another. Corresponding derivatives of the dicarboxylic acids may be used instead of the free dicarboxylic acids — for example, the dicarboxylic acid esters of alcohols having from 1 to 4 carbon atoms, or dicarboxylic anhydrides. Preferably, dicarboxylic acid mixtures of succinic, glutaric, and adipic acid are used in amounts of, for example, 20–35; 35–50; 20–32 parts by weight. Examples for di- and tri-functional alcohols, in particular diols, are ethanediol, diethylene glycol, 1,2-respectively 1,3-propanediol, dipropylene glycol, 1,4-butanediol, 1,5-pentanediol, 1,6-hexanediol, 1,10-decanediol, glycerine, and trimethylolpropane. Preferably used are ethanediol, diethylene glycol, 1,4-butanediol, 1,5-pentanediol, 1,6-hexanediol, or mixtures of at least two of the cited diols, in particular mixtures of 1,4-butanediol, 1,5-pentanediol, and 1,6-hexanediol. In addition, polyester polyols derived from lactones may be used, for example, n-caprolactone, as may hydroxy carboxylic acids, for example, -hydroxycaproic acid, the polyester polyols for example, from -hydroxycaproic acid.

These aliphatic polyester polyols, which are also produced by well known conventional methods, have the same effect in component B as the aliphatic amino polyol.

In the aliphatic polyether polyols, the aliphatic chain length may be from 3 to 20 carbon atoms long. The hydroxyl number of the aliphatic polyether polyol is from about 300 to about 900; the compounds have a functionality of 3–5 and a molecular weight range of 200 to 3000.

The aliphatic polyether polyols are produced with known methods, for example through anionic polymerization with alkali hydroxides such as sodium or potassium hydroxide, or alkali alcoholates such as sodium methylate, sodium or potassium methylate, or potassium isopropylate as catalysts on an initiator which contains bonded to the molecular from 2 to 6 reactive hydrogen atoms, preferably from 2 to 3, or through cationic polymerization with Lewis acids such as antimony pentachloride, boron fluoride etherate, etc. or bleaching earth as catalysts from one or more alkylene oxides having from 2 to 4 carbon atoms in the alkylene radical. Suitable alkylene oxides, are for example, tetrahydrofuran, 1,3-propylene oxide, 1,2- and 2,3-butylene oxide, styrene oxide, epichlorohydrin, and preferably ethylene oxide and 1,2-propylene oxide. The ethylene oxides may be used individually, alternately one after another, or as mixtures.

The effect of the aliphatic polyether polyols is the same in component B as that of the aliphatic amino polyols described above.

Component B further includes an aromatic polyol which is the condensation product of phenol and one or more of the amino polyols described above. The aromatic amino polyol has a hydroxyl number of from about 200 to about 800 and a functionality of 3–5. Suitable compounds include polyalkylene oxide polyols.

The aromatic amino polyols contribute good dimensional stability to the foam, as well as high compressive strength, good foam adhesion and superior fire retardancy.

Component B further includes a polyurethane rapid initiator. Suitable initiators include triethylamine, tributylamine, dimethylbenzylamine, N-methyl-, N-ethyl-N-cyclohexyl-morpholine, N,N,N',N'-tetramethylethylenediamine, N,N,N'-N'-tetramethylbutanediamine, pentamethyldiethylenetriamine, tetramethyl-diaminoethylether, bis(dimethylaminopropyl) urea, dimethylpiperazine, 1,2-dimethylimidazol, 1-azabicyclo(3.3.0)octane and preferably 1,4-diazabicyclo(2.2.2)-octane, and alkanolamine compounds such as triethanolamine, diisopropanolamine, N-methyl- and N-ethyldiethanolamine, and dimethylethanolamine.

These materials are commercially available from Union Carbide Corporation, Air Products and Chemical, Inc. Rhein Chemie.

Further suitable initiators include triethylamine, diethyleneamine, lead, naphthenate, tin naphthenate, tin mercaptan, and a tin "catalyst" described in U.S. Pat. No. 3,055,845, hereby incorporated by reference. The initiator helps speed up the reaction between components A and B and reduces cure time of the foam.

A further ingredient in component B is base surfactant. Useful surfactants include for example, those well known in the art, e.g., organo-silicone ethers. One preferred polyether silicone is designated Surfactant L-532, commercially available from Union Carbide Corporation. Another is dimethylpolysiloxane, commercially available from Air Products and Chemical and Goldschmidt Co.

Where present in component B and the resultant foam, the surfactant helps control the foams' cell structure and size.

Factor (vii) in component B is a catalyst from the hydroxyl/di-isocyanate polymerization reaction. Suitable catalysts for this reaction include triethanolamine, dimethylethanolamine, and the tertiary amine tri(3-dimethylamine)propylamine.

Factor (viii) of component B is water. Any conveniently available source of water, e.g., tap water, is suitable for inclusion in component B. As is well known, the water reacts with the isocyanate groups of component A, resulting in release of carbon dioxide and hence, foaming of the liquid mixture. Thus the co-mingled components are converted to a durable state while being imparted with the characteristic foam structure.

A preferred embodiment of the invention is a hydroxyl group containing component for use in a sprayable system for creating polyurethane foam without the use of fluorinated hydrocarbons. In this embodiment, component A comprises diphenylmethano di-isocyanate. Component B consists essentially of factors (i) through (viii) as described above with the following modifications. Component B consists essentially of a mixture totaling 100 parts by weight of from about 18 to 45 parts of at least one member of the group of factors (i) and (ii). Factor (i) consists essentially of from 25 to about 12 parts of the condensation product of an aliphatic triol with a propanol or ethanol as described above. Factor (ii) consists essentially of from 6 to about 18 parts of a condensation product of a hexose with a propane diol or propane triol as described above.

Component B further includes factors (iii) through (viii) in the amounts indicated in Table I.

TABLE I

| Factor No. | Parts/100 parts of Component B |
|---|---|
| (iii) | From about 24 to about 40 |
| (iv) | From about 7.5 to about 22.5 |
| (v) | From about 0.5 to about 1.5 |
| (vi) | From about 0.5 to about 1.5 |
| (vii) | From about 0.75 to about 3.75 |
| (viii) | From about 6 to about 0.6 |

In several further embodiments of the invention, the hydroxyl group containing component contains only factor (i); or only factor (ii); or both factors of the group consisting of factors (i) and (ii).

Another embodiment of the invention has a component B which further contains as factor (ix); from about 7.5 to about 22.5 parts of a tri(haloalkylphosphate). Suitable compounds include tri(1-chloromethyl ethyl phosphate), tri(2-chloroisopropyl phosphate) and tri(3-chloro-N-pentyl phosphate). The alkyl group in these compounds has a chain length of from 2 to 12 carbon atoms. These compounds are commercially available from Akzo Albright and Wilson.

In yet a further embodiment of the invention, factor (vii) consists essentially of from about 0.25 to about 0.75 parts of a catalyst for the water/di-isocyanate polymerization reaction and from about 1 to about 3 parts of a catalyst for the polyol/di-isocyanate polymerization reaction. This embodiment may optionally further contain from about 7.5 to about 22.5 parts of a tri(haloalkyl phosphate).

In a preferred embodiment of the invention, component B consists essentially of a mixture totaling 100 parts by weight of from about 18 to about 45 parts of at least one member of the group of factors (i) and (ii), the factors consisting essentially of (i) from about 25 to about 12 parts of a condensation product of an alihatic triol with propanol or ethanol of hydroxyl number from about 50 to about 650 and a molecular weight of about 250 to about 1600, where at least one member of the group consists of propoxylated glycerol and ethoxylated glycerol, (ii) from about 6 to about 18 parts of a condensation product of a hexose with propane diol or propane triol of hydroxyl number from about 200 to about 800 and a functionality of 4–5, where at least one member of the group consists of propoxylated sucrose and propoxylated glycerol; factors (iii) and (iv) being as above described; and in factor (v) at least one member of the group consists of triethylamine, diethylamine, lead naphthenate, tin naphthenate and tin mercaptan; the surfactant is a polysiloxate; factor (ix) is a tri(lower alkyl phosphate) of 1–4 carbons in the alkyl moiety, and factor (x) is at least one member of the group consisting of pentamethyl-diethylenetriamine and triethylamine, and factor (xii) is at least one member of the group consisting of tris(3-dimethylamino)propylamine and diethylene amine.

Due to the unique blend of factors in component B, when components B and A are mixed, a simultaneous reaction of water and polyether alcohols with the NCO groups will occur. Due to the unique catalyzation, a second stage reaction between the hydroxyl and NCO groups has been eluted. Therefore the resultant foam, when spray applied, will rise uniformly without any shear characteristics. Whether the foam is made by spraying or in a mold after mixing, the foam is based on the present invention to include components A and b in substantially equal volume amounts.

In yet another embodiment of the invention is a sprayable system for creating polyurethane foam without the use of fluorinated hydrocarbons. This system comprises components A and B, where component A is diphenylmethane di-isocyanate and component B is the hydroxyl group containing component.

Another embodiment of the invention is a sprayed polyurethane foam created with the use of fluorinated hydrocarbons created from a system comprising components A and B, where component B is diphenylmethane di-isocyanate and component B is the hydroxyl group containing component. A preferred variant of this embodiment is a foam having a compressive strip of from about 1.5 to about 4.5 $kg/cm^2$ and a density of from about 15 to about 80 $kg/m^3$.

Compressive strength is measured in accordance with ASTM D-1621. Specimens with the dimensions of 2"×2"×1" were used for the test. The compressive strength was calculated from the maximum load (a yield point or a 10% deformation was reached), dividing the area of cross sections. (This description of compressive strength is drawn from U.S. Pat. No. 4,454,251, column 6, lines 49-57) which is incorporated here by reference. The resulting foam has fine uniform cell structure with good strength and dimensional stability. This foam is suitable for thermal insulation for building construction, roofing, siding, floors, wall cavities and also for tanks, vessels, and piping. As noted, this foam has excellent heat resistance with very little scorching and has no surface viability, because the foam has a uniform dense skin surface.

A further embodiment of the invention is a method of forming a sprayed polyurethane foam without the use of fluorinated hydrocarbons which comprises mixing, in a conventional foam spraying means as component A, diphenylmethane di-isocyanate and as component B, the hydroxyl group described above. This mixing is performed at ambient temperature in the absence of additional propellants. The mixed components are sprayed from the spraying means onto a substrate surface where the foam is formed and cured.

In a preferred embodiment, each of the respective components A and B are selected to provide substantially molar equivalent numbers of isocyanate groups in component A and hydroxyl in component B.

Thus, for example the components A and B may be sprayed together in a 1:1 volume fix-spray in Glass-Craft spray equipment. The A and B components are intimately mixed and exit from separate nozzles and react in a spray form. The viscosity of components A and B generally should be less than 600 cps as measured on a Brookfield viscometer; however, it is preferred that the viscosity be from 300 to 450 cps.

The preferred method of forming the foam coating is by spraying the A and B components together. However, it is recognized that a urethane resin may be formed by reacting the A and B components together by techniques other than spraying, such as by rapidly mixing the mixtures together for use as a molding-type resin. Due to the generally fast reaction time, the forming of a coating by spraying the mixtures together onto a substrate is the preferred method of reaction. (These details on spraying and spraying versus foaming are drawn from U.S. Pat. No. 4,543,366, bottom of column 7 through column 8) which is incorporated here by reference.

The following examples describe in detail most components A and B, the sprayable system and foams resulting from the spray of components A and B, as well as method for making such foams. Many modifications, both of materials and methods can be made without departing from the spirit and scope of this invention.

EXAMPLE I

A foam, conventional was made according to the formulations below.

TABLE II

| Conventional Polyurethane Foam Composition | |
| --- | --- |
| Ingredient | % by Weight |
| Component A | |
| diphenylmethane di-isocyanate | 90% |
| tri(1-chloromethyl ethyl phosphate)/tri(2-chloroisopropyl phosphate) | 10% |

TABLE II-continued

| Conventional Polyurethane Foam Composition | |
| --- | --- |
| Ingredient | % by Weight |
| Component B | |
| polyalkylene oxide polyol | 27.7-37.2% |
| polyester and polyethyl polyols | 28.0-30.34% |
| diethyleneglycol (2.2-oxy-bis-ethanol) | 7.0-6.17% |
| tri(1-chloromethyl and tri(2-chloro-iso-propyl) | 8.0-8.98% |
| polysiloxane | 0.4-0.4% |
| N,N-dimethylethanol amine | 0.8-0.8% |
| 24% lead naphthenate solution | 0.1-0.11% |
| trichlorofluoromethane | 28.0-16.0% |

Component B is made by adding each of the listed elements in Table II to a vessel in the sequence in they are listed. After addition, each new element is added to the mixture already there. Component B is held separate from component A until such time as they are sprayed from conventional spraying equipment. The density of the resultant foam is 1.5-3.0 pcf.

EXAMPLE II

A foam made in accordance with the present invention is described in Table III.

TABLE III

| Ingredient | % by weight |
| --- | --- |
| Component A | |
| diphenylmethane di-isocyanate (2.2-2.4) | 125.0% |
| Component B | |
| oxypropylated and ethylated glycerol | 30.0-11.8% |
| aliphatic amino polyol | 24.0-40% |
| propoxylated sucrose/propoxylated glycerol | 12.5-12.5% |
| polyalkylene oxide polyol | 15.0-15.0% |
| tri(1-chloromethyl and tri(2-chloro-iso-propyl) | 15.0-15.0% |
| $H_2O$ | 4.0-1.2% |
| Polysiloxane | 1.0-1.0% |
| triamine/diethylene amine | 1.0-1.0% |
| Pentamethyl diethylene triamine | 0.5-0.5% |
| Tris(3-dimethylamine) propylamine | 2.0-2.0 |

The mixing components A to B in both the conventional and the novel foam is 100 parts of component A to 100 parts of component B, or 1:1 by volume. The density of the resultant foam is 1.5-3.0 pcf.

EXAMPLE III

A foam made in accordance with the present invention is described in Table IV.

TABLE IV

| Ingredient | % by weight |
| --- | --- |
| Component A | |
| diphenylmethane di-isocyanate (2.2-2.4) | 125.0% |
| Component B | |
| oxypropylated and ethylated glycerol | 29.5% |
| aliphatic amino polyol | 20.0% |
| propoxylated sucrose/propoxylated glycerol | 12.5% |
| polyalkylene oxide polyol | 15.0% |
| tri(1-chloromethyl) ethylphosphate and tri(2-chloro)isopropyl phosphate | 15.0% |
| $H_2O$ | 3.5% |
| Polysiloxane | 1.0% |
| triamine/diethylene amine | 1.0% |
| Pentamethyl diethylene triamine | 0.5% |
| Tris(3-dimethylamine) propylamine | 2.0% |

The mixing components A to B in both conventional and the novel foam is 100 parts of component A to 100 parts of component B, or 1:1 by volume. The density of the resultant foam is 2.0 pcf (32 kg/m³).

EXAMPLE IV

A foam made in accordance with the present invention is described in Table V.

TABLE V

| Ingredient | % by weight |
|---|---|
| Component A | |
| diphenylmethane di-isocyanate (2.2-2.4) | 125.0% |
| Component B | |
| oxypropylated and ethylated glycerol | 23.8% |
| aliphatic amino polyol | 26.0% |
| propoxylated sucrose/propoxylated glycerol | 13.4% |
| polyalkylene oxide polyol | 15.0% |
| tri(1-chloromethyl) ethylphosphate and tri(2-chloro) isopropyl phosphate | 15.0% |
| H₂O | 2.9% |
| Polysiloxane | 1.0% |
| triamine/diethylene amine | 1.0% |
| Pentamethyl diethylene triamine | 0.5% |
| Tris(3-dimethylamine) propylamine | 2.0% |

The mixing components A to B in both conventional and the novel foam is 100 parts of component A to 100 parts of component B, or 1:1 by volume. The density of the resultant foam is 2.4 pcf (38.5 kg/m³).

EXAMPLE V

A foam made in accordance with the present invention is described in Table VI.

TABLE VI

| Ingredient | % by weight |
|---|---|
| Component A | |
| diphenylmethane di-isocyanate (2.2-2.4) | 125.0% |
| Component B | |
| oxypropylated and ethylated glycerol | 20.0-11.8% |
| aliphatic amino polyol | 29.8-40% |
| propoxylated sucrose/propoxylated glycerol | 13.4-12.5% |
| polyalkylene oxide polyol | 15.0-15.0% |
| tri(1-chloromethyl) ethyl phosphate and tri(2-chloro) isopropyl phosphate | 15.0-15.0% |
| H₂O | 2.3-1.2% |
| Polysiloxane | 1.0-1.0% |
| triamine/diethylene amine | 1.0-1.0% |
| Pentamethyl diethylene triamine | 0.5-0.5% |
| Tris(3-dimethylamine) propylamine | 2.0-2.0 |

The mixing components A to B in both conventional and the novel foam is 100 parts of component A to 100 parts of component B, or 1:1 by volume. The density of the resultant foam is 3.0 pcf (48 kg/m³).

EXAMPLE VII

The foam made in accordance with the present invention is seen to have superior fire retardancy; in accordance with UL-790 protocol.

TYPICAL PHYSICAL PROPERTIES OF THE FOAM

| Property | 5070-2.0 | 5070-2.5 | 5070-3.0 |
|---|---|---|---|
| Density, pcf-sprayed | 1.9-2.1 | 2.4-2.6 | 2.9-3.2 |
| K-Factor, aged | 0.170 | 0.168 | 0.167 |
| Compressive Strength, psi | 28 | 36 | 48 |
| Shear Strength, psi | 24 | 32 | 39.0 |
| Water vapor transmission (perms) | 2.8 | 2.3 | 2.0 |
| Humid aging, 158° F./98% RH, 1 week | | | |
| a. Volume change | −2.6 | −1.8 | −1.67 |
| b. Weight change | +1.1 | +0.9 | +0.75 |

REACTIVITY CHARACTERISTIC (Laboratory Analysis)

| | Winter | Regular | Summer |
|---|---|---|---|
| Cream Time | 2-3 sec. | 3-5 sec. | 5-7 sec. |
| Rise Time | 6-10 sec. | 10-18 sec. | 18-24 sec. |
| Tack Free Time | On Rise | On Rise | On Rise |
| Cure Time | 4 hours | 4 hours | 4 hours |

LIQUID COMPONENT PROPERTIES

| Property | Prepolymer | Resin |
|---|---|---|
| Color | Dark Brown | Amber |
| Specific Gravity | 1.27 | 1.08 |
| Weight per gallon | 10.5 lbs. | 9.5 lbs. |
| Viscosity-Brookfield | 300 cps | 350-450 cps |
| Mixing Ration by volume | 100 | 100 |

FIRE HAZARD CLASSIFICATION ... ASTM E-84 (Estimated)

| Foam Thickness | Flame Spread | Fuel Contribution | Smoke Developed |
|---|---|---|---|
| 4 Inches | <75 | <15 | <450 |

This numerical flame spread rating and all other test data presented are not intended to reflect hazards presented by this or any other material under actual fire conditions.

I claim:

1. A hydroxyl group containing component for use in a sprayable two component system for creating rigid polyurethane foam without the use of fluorinated hydrocarbons consisting essentially of a mixture of at least one member selected from the group consisting of factors (i) and (ii),
    i) a condensation product of an aliphatic triol with propanol or ethanol,
    ii) a condensation product of a hexose with propane diol or propane triol, and
    iii) a polyol selected from the group consisting of an aliphatic aminopolyol, aliphatic polyester polyols and aliphatic polyether polyols,
    iv) an aromatic aminopolyol,
    v) a polyurethane rapid initiator,
    vi) a surfactant,
    vii) a catalyst for the hydroxyl/di-isocyanate polymerization reaction, and
    viii) water.

2. A hydroxyl group containing component for use in a sprayable two component system for creating rigid polyurethane foam without the use of fluorinated hydrocarbons consisting essentially of a mixture totaling 100 parts by weight of from about 18 to about 45 parts of at least one member selected from the group consisting of factors (i) and (ii),
    i) from about 25 to about 12 parts of a condensation product of an aliphatic triol with propanol or ethanol of OH number from about 50 to about 650 and molecular weight from about 250 to about 1600,
    ii) from about 6 to about 18 parts of a condensation product of a hexose with propane diol or propane triol of OH number from about 200 to about 800 and functionality of 4-5, and
    iii) from about 24 to about 40 parts of an aliphatic aminopolyol of OH number from about 300 to about 900 and a functionality of 3-5, iv) from about 7.5 to about 22.5 parts of an aromatic aminopolyol of OH number from about 200 to about 800 and a functionality of 3-5,
v) from about 0.5 to about 1.5 parts of a polyurethane rapid initiator,
vi) from about 0.5 to about 1.5 parts of a surfactant,
vii) from about 0.75 to about 3.75 parts of a catalyst for the hydroxyl/di-isocyanate polymerization reaction, and
viii) from about 6 to about 0.6 parts of water.

3. The hydroxyl group containing component of claim 1 wherein the only member selected from the group consisting of factors (i) and (ii) which is present, is factor (i).

4. The hydroxyl group containing component of claim 2 wherein the only member selected from the group consisting of factors (i) and (ii) which is present, is factor (i).

5. The hydroxyl group containing component of claim 2 wherein the only member selected from the group consisting of factors (i) and (ii) which is present, is factor (ii).

6. The hydroxyl group containing component of claim 2 wherein both the members selected from the group consisting of factors (i) and (ii) are present.

7. A hydroxyl group containing component for use in sprayable two component system for creating rigid polyurethane foam without the use of fluorinated hydrocarbons consisting essentially of a mixture totaling 100 parts by weight of from about 18 to about 45 parts of at least one member selected from the group consisting of factors (i) and (ii),
(i) from about 25 to about 12 parts of a condensation product of an aliphatic triol with propanol or ethanol of OH number from about 50 to about 650 and molecular weight from about 250 to about 1600,
ii) from about 6 to about 18 parts of a condensation product of a hexose with propane diol or propane triol of OH number from about 200 to about 800 and a functionality of 4-5,
iii) from about 24 to about 40 parts of an aliphatic aminopolyol of OH number from about 300 to about 900 and a functionality of 3-5,
iv) from about 7.5 to about 22.5 parts of an aromatic aminopolyol of OH number from about 200 to about 800 and a functionality of 3-5,
v) from about 0.5 to about 1.5 parts of a polyurethane rapid initiator,
vi) from about 0.5 to about 1.5 parts of a surfactant,
vii) from about 0.75 to about 3.75 parts of a catalyst for the hydroxyl/di-isocyanate polymerization reaction,
viii) from about 6 to about 0.6 parts of water and
ix) from about 6 to about 0.6 parts of a tri (haloalkyl phosphate).

8. The hydroxyl group containing component of claim 2 wherein factor (vii) consists essentially of
x) from about 0.25 to about 0.75 parts of a catalyst for the water/di-isocyanate polymerization reaction and
xi) from about 1 to about 3 parts of a catalyst for the polyol/di-isocyanate polymerization reaction.

9. A hydroxyl group containing component for use in sprayable two component system for creating rigid polyurethane foam without the use of fluorinated hydrocarbons consisting essentially of a mixture totaling 100 parts by weight of from about 18 to about 45 parts of at least one member selected from the group consisting of factors (i) and (ii),
(i) from about 25 to about 12 parts of a condensation product of an aliphatic triol with propanol or ethanol of OH number from about 50 to about 650 and molecular weight from about 250 to about 1600,
ii) from about 6 to about 18 parts of a condensation product of a hexose with propane diol or propane triol of OH number from about 200 to about 800 and a functionality of 4-5, and
iii) from about 24 to about 40 parts of an aliphatic aminopolyol of OH number from about 300 to about 900 and a functionality of 3-5,
iv) from about 7.5 to about 22.5 parts of an aromatic aminopolyol of OH number from about 200 to about 800 and a functionality of 3-5,
v) from about 0.5 to about 1.5 parts of a polyurethane rapid initiator,
vi) from about 0.5 to about 1.5 parts of a surfactant,
vii) a) from about 0.25 to about 0.75 parts of a catalyst for the water/di-isocyanate polymerization reaction, and
vii) b) from about 1 to about 3 parts of a catalyst for the polyol/di-isocyanate polymerization reaction,
viii) from about 6 to about 0.6 parts of water and
ix) from about 7.5 to about 22.5 parts of a tri (haloalkyl phosphate).

10. The hydroxyl group containing component of claim 9 wherein
v) is at least one member of the group consisting of triethylamine, diethylenamine, lead naphthenate, tin naphthenate and tin mercaptan,
vi) is a polysiloxane,
vii) a) is at least one member of the group consisting of pentamentyl diethylene triamine and tri(3-dimethylamino) propylamine,
vii) b) is at least one member of the group consisting of triethylamine and diethylene amine and
ix) is a tri(lower alkyl phosphate) of 1-4 carbons in the alkyl moiety.

11. A sprayable system for creating rigid polyurethane foam without the use of fluorinated hydrocarbons comprising
a) as Component A: diphenylmethane di-isocyanate, and
b) as Component B: a hydroxyl group containing component of claim 2.

12. The sprayable system for creating rigid polyurethane foam without the use of fluorinated hydrocarbons comprising
a) as Component A: diphenylmethane di-isocyanate, and
b) as Component B: the hydroxyl group containing component of claim 10.

13. A sprayed rigid polyurethane foam created without the use of fluorinated hydrocarbons created from a system comprising
a) as Component A: diphenylmethane di-isocyanate, and
b) as Component B: a hydroxyl group containing component of claim 2.

14. The sprayed rigid polyurethane foam created without the use of fluorinated hydrocarbons created from a system comprising
a) as Component A: diphenylmethane di-isocyanate, and
b) as Component B: the hydroxyl group containing component of claim 10.

15. The sprayed rigid polyurethane foam of claim 13 having compressive strength of from about 1.5 to about 4.5 Kg/cm$^2$ and a density of from about 15 to about 80 Kg/m$^3$.

16. The sprayed rigid polyurethane foam of claim 14 having a compressive strength of from about 1.5 to about 4.5 Kg/cm$^2$ and a density of from about 15 to about 80 Kg/m$^3$.

17. A method of forming a sprayed rigid polyurethane foam without the use of fluorinated hydrocarbons which comprises mixing, in a conventional foam spraying means
 a) as Component A: diphenylmethane di-isocyanate, and
 b) as Component B: a hydroxyl group containing component of claim 2, at ambient temperature in the absence of additional propellants.

18. The method of forming a sprayed rigid polyurethane foam without the use of fluorinated hydrocarbons which comprises mixing, in a conventional foam spraying means;
 a) as Component A: diphenylmethane di-isocyanate, and
 b) as Component B: the hydroxyl group containing component of claim 10, at ambient temperature in the absence of additional propellants.

19. The method of claim 17 forming a sprayed rigid polyurethane foam wherein the weights of the respective components are selected to provide substantially molar equivalent numbers of isocyanate groups in component A and hydroxyl groups in component B.

20. The method of claim 18 forming a sprayed rigid polyurethane foam wherein the weights of the respective components are selected to provide substantially molar equivalent numbers of isocyanate groups in component A and hydroxyl groups in component B.

* * * * *